United States Patent
Yoon et al.

(10) Patent No.: US 12,388,148 B2
(45) Date of Patent: Aug. 12, 2025

(54) BATTERY MODULE, BATTERY PACK, AND VEHICLE INCLUDING SAME

(71) Applicant: LG ENERGY SOLUTION, LTD., Seoul (KR)

(72) Inventors: Hyoung-Chul Yoon, Daejeon (KR); Jae-Sang Kim, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 532 days.

(21) Appl. No.: 17/919,583

(22) PCT Filed: Sep. 8, 2021

(86) PCT No.: PCT/KR2021/012243
§ 371 (c)(1),
(2) Date: Oct. 18, 2022

(87) PCT Pub. No.: WO2022/060003
PCT Pub. Date: Mar. 24, 2022

(65) Prior Publication Data
US 2023/0155241 A1    May 18, 2023

(30) Foreign Application Priority Data
Sep. 21, 2020    (KR) .................. 10-2020-0121769

(51) Int. Cl.
*H01M 50/271*    (2021.01)
*H01M 10/655*    (2014.01)
(Continued)

(52) U.S. Cl.
CPC ....... *H01M 50/271* (2021.01); *H01M 10/655* (2015.04); *H01M 50/213* (2021.01); *H01M 50/291* (2021.01); *H01M 50/503* (2021.01)

(58) Field of Classification Search
CPC ............. H01M 50/271; H01M 50/203; H01M 50/503; H01M 50/502; H01M 50/213
See application file for complete search history.

(56) References Cited

U.S. PATENT DOCUMENTS

| | | | |
|---|---|---|---|
| 8,920,955 | B1 | 12/2014 | Chuang et al. |
| 2011/0293986 | A1 | 12/2011 | Kozu |

(Continued)

FOREIGN PATENT DOCUMENTS

| | | | |
|---|---|---|---|
| CN | 110337735 | A | 10/2019 |
| CN | 111009626 | A | 4/2020 |

(Continued)

OTHER PUBLICATIONS

Office Action issued Dec. 4, 2023 for Japanese Patent Application No. 2022-564053.

(Continued)

*Primary Examiner* — Basia A Ridley
*Assistant Examiner* — Heng M. Chan
(74) *Attorney, Agent, or Firm* — Morgan, Lewis & Bockius LLP

(57) ABSTRACT

A battery module provides improved stability against fire or explosion. A battery pack and a vehicle may include such battery module. The battery module includes a plurality of battery cells, each having electrode terminals respectively provided at an upper portion and a lower portion thereof; a connection plate for the plurality of battery cells, the connection plate including a connection portion extending from a body portion to contact the electrode terminal; and a module case configured such that the connection plate is mounted to an outer side thereof, the module case being configured to accommodate the plurality of battery cells therein, the module case including a plurality of exposure holes configured to expose the electrode terminals of each of (Continued)

the plurality of battery cells to the outside and a cover portion configured to protrude toward the connection plate from an outer circumference of the exposure hole.

11 Claims, 6 Drawing Sheets

(51) Int. Cl.
*H01M 50/213* (2021.01)
*H01M 50/291* (2021.01)
*H01M 50/503* (2021.01)

(56) References Cited

U.S. PATENT DOCUMENTS

| | | |
|---|---|---|
| 2016/0141573 A1 | 5/2016 | Aoki et al. |
| 2016/0204404 A1 | 7/2016 | Shimizu et al. |
| 2019/0097203 A1 | 3/2019 | Kwang et al. |
| 2019/0214694 A1 | 7/2019 | Yang et al. |
| 2019/0372069 A1 | 12/2019 | Lee et al. |
| 2019/0372182 A1 | 12/2019 | Takayasu |
| 2020/0280040 A1 | 9/2020 | Lee et al. |
| 2020/0321590 A1 | 10/2020 | Park et al. |
| 2021/0050568 A1 | 2/2021 | Yang et al. |
| 2023/0223614 A1 | 7/2023 | Kwag |

FOREIGN PATENT DOCUMENTS

| | | |
|---|---|---|
| EP | 3293786 B1 | 6/2019 |
| JP | H8-115741 A | 5/1996 |
| JP | 2001-243975 A | 9/2001 |
| JP | 3328868 B2 | 9/2002 |
| JP | 2008-198435 A | 8/2008 |
| JP | 2014-197452 A | 10/2014 |
| JP | 2019-091522 A | 6/2019 |
| KR | 10-2019-0032887 A | 3/2019 |
| KR | 10-2019-0083533 A | 7/2019 |
| KR | 10-2019-0142581 A | 12/2019 |
| KR | 10-2020-0051393 A | 5/2020 |
| WO | 2015/064096 A1 | 5/2015 |
| WO | 2018/150672 A1 | 8/2018 |

OTHER PUBLICATIONS

The extended European Search Report, dated Apr. 3, 2024, issued in corresponding EP Patent Application No. 21869625.0.
International Search Report (with partial translation) and Written Opinion dated Dec. 27, 2021, for corresponding International Patent Application No. PCT/KR2021/012243.
Office Action issued in corresponding Taiwanese Patent Application No. 110134847, dated Dec. 3, 2024.

BATTERY MODULE, BATTERY PACK, AND VEHICLE INCLUDING SAME

TECHNICAL FIELD

The present disclosure relates to a battery module, a battery pack and a vehicle including the same, and more particularly, to a battery module with improved stability against fire or explosion, a battery pack and a vehicle including the same. The present application claims priority to Korean Patent Application No. 10-2020-0121769 filed on Sep. 21, 2020 in the Republic of Korea, the disclosures of which are incorporated herein by reference.

BACKGROUND ART

In recent years, the demand for portable electronic products such as notebooks, video cameras, mobile phones, or the like is rapidly increasing, and the development of electric vehicles, energy storage batteries, robots, satellites, or the like is in earnest. For this reason, high-performance secondary batteries enabling repeated charging and discharging are being actively researched.

Secondary batteries commercialized at the present include nickel cadmium batteries, nickel hydrogen batteries, nickel zinc batteries, and lithium secondary batteries. Among them, lithium secondary batteries are in the spotlight due to advantages such as free charging and discharging by little memory effect compared to nickel-based secondary batteries, and very low self-discharge rate and high energy density.

The lithium secondary battery mainly uses a lithium-based oxide and a carbon material as a positive electrode active material and a negative electrode active material, respectively. Also, the lithium secondary battery includes an electrode assembly in which a positive electrode plate and a negative electrode plate respectively coated with the positive electrode active material and the negative electrode active material are disposed with a separator being interposed therebetween, and an exterior, namely a battery case, for hermetically storing the electrode assembly together with an electrolyte.

In addition, the lithium secondary battery may be classified depending on the exterior shape into a can-type secondary battery in which an electrode assembly is included in a metal can and a pouch-type secondary battery in which an electrode assembly is included in a pouch made of an aluminum laminate sheet.

In particular, the demand for large-capacity battery modules applied to electric vehicles or the like is increasing recently. Such a large-capacity battery module includes a plurality of battery cells. Thus, when a fire or explosion occurs in a part of the plurality of battery cells, high-temperature fragments of the electrode assembly, flames, and high-temperature gas are discharged to adjacent other battery cells to increase the temperature thereof. Accordingly, thermal runaway, fire, or the like may be propagated to adjacent other battery cells to cause a secondary explosion, thereby increasing the damage.

DISCLOSURE

Technical Problem

The present disclosure is designed to solve the problems of the related art, and therefore the present disclosure is directed to providing a battery module with improved stability against fire or explosion, a battery pack and a vehicle including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a plurality of battery cells, each having electrode terminals respectively provided at an upper portion and a lower portion thereof;

a connection plate having electric conductivity to electrically connect the plurality of battery cells, the connection plate including a body portion extending in a horizontal direction and a connection portion extending from the body portion to contact the electrode terminal; and a module case configured such that the connection plate is mounted to an outer side thereof, the module case being configured to accommodate the plurality of battery cells therein, the module case including a plurality of exposure holes configured to expose the electrode terminals of each of the plurality of battery cells to the outside and a cover portion configured to protrude toward the connection plate from an outer circumference of the exposure hole.

Also, the cover portion may have a hollow and be shaped to be opened in at least a top end thereof.

In addition, the cover portion may include a bending part bent at the protruding end of the cover portion to extend in a horizontal direction to hide a part of the exposure hole of the module case.

Also, the connection plate may include a plurality of connection holes formed by opening a part of the body portion so that the connection portion is located in the opening thereof, and the cover portion may be configured such that the open end thereof is inserted into the connection hole.

Moreover, the connection plate may include an extension portion configured to extend from the connection hole toward the battery cell to screen an internal material ejected from the battery cell.

In addition, the battery module may further comprise a heat conduction pad having thermal conductivity and mounted to an outer side of the connection plate, the heat conduction pad having a plurality of communication holes configured to communicate with the connection hole.

Further, the communication hole may be formed relatively smaller than the opening size of the connection hole.

Also, the heat conduction pad may include two or more screen portions respectively configured to extend toward a center of the communication hole from an outer circumference of the communication hole to screen an internal material ejected from the battery cell, the two or more screen portions being located to be spaced apart from each other.

In addition, in another aspect of the present disclosure, there is also provided a battery pack, comprising at least one battery module as above.

Moreover, in another aspect of the present disclosure, there is also provided a vehicle, comprising at least one battery module as above.

Advantageous Effects

According to an embodiment of the present disclosure, the module case included in the battery module according to the present disclosure includes the cover portion protruding from the outer circumference of the exposure hole toward the connection plate. This structure may physically block the movement of a high-temperature active material discharged from the exploded battery cell to adjacent battery cells while maintaining the function of ejecting, namely venting, the gas and flame generated when the battery cell is ignited. By doing so, when the battery cell behaves abnormally to explode so that the internal material is ejected, gas and flame are ejected through the exposure hole, but the movement of the high-temperature active material is suppressed by the cover portion. Therefore, it is possible to prevent the internal material from moving to other adjacent battery cells through other exposure holes. Therefore, it is possible to prevent chain ignition, such as propagating of thermal runaway, fire or explosion to other battery cells. Accordingly, the present disclosure may greatly improve the safety.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODES OF PRACTICE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
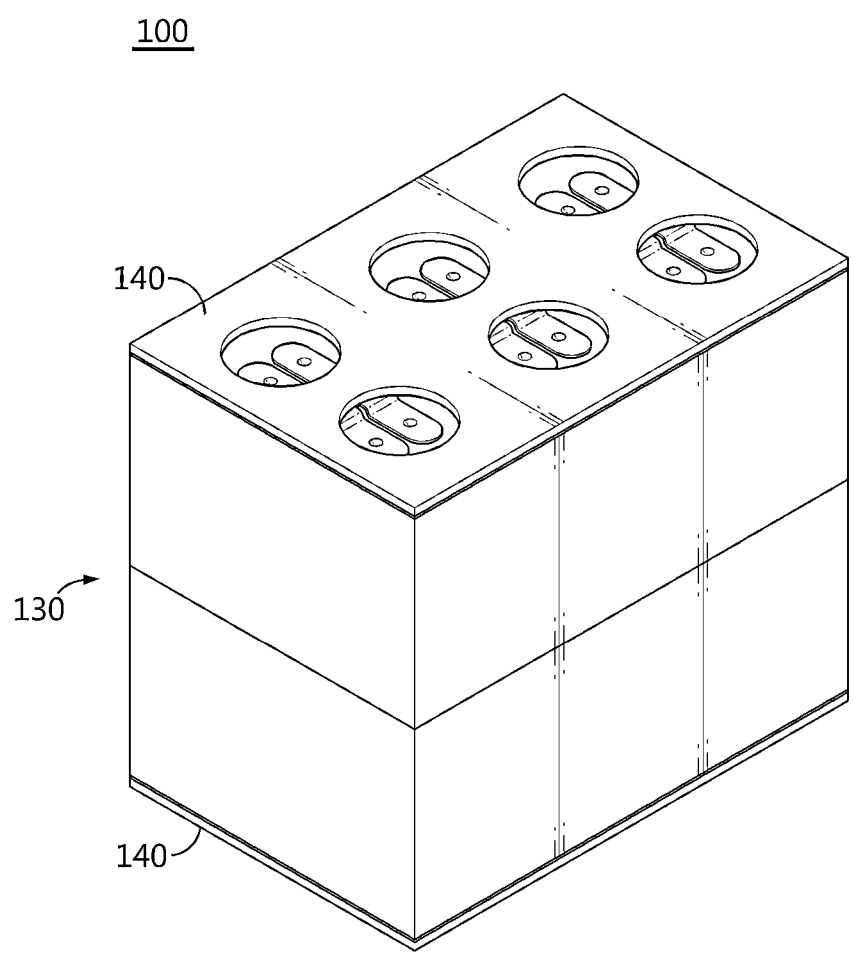
FIG. 1 is a perspective view schematically showing a battery module according to an embodiment of the present disclosure.
Figure 2:
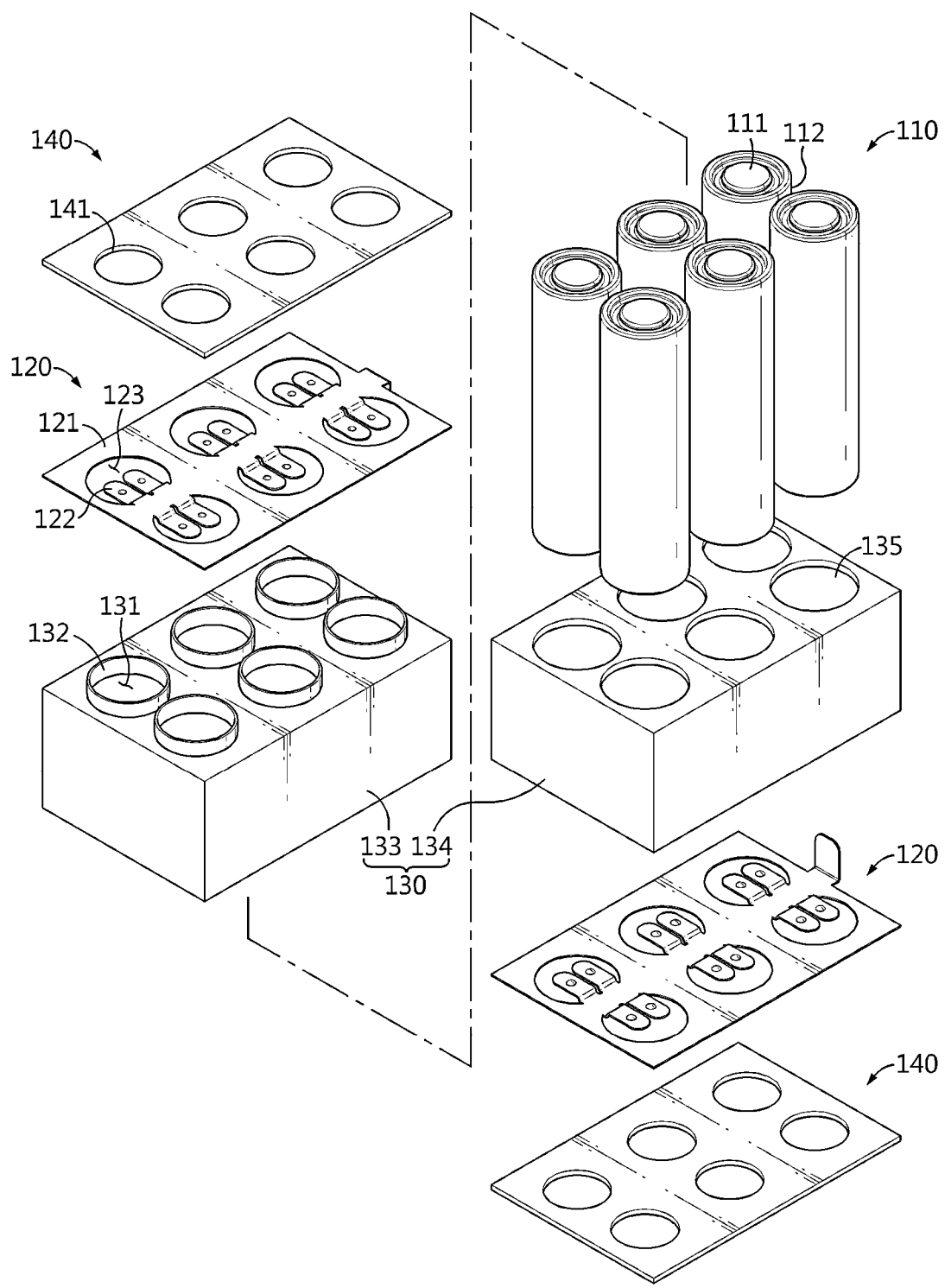
FIG. 2 is an exploded perspective view schematically showing the battery module according to an embodiment of the present disclosure.

FIG. 1 is a perspective view schematically showing a battery module according to an embodiment of the present disclosure. FIG. 2 is an exploded perspective view schematically showing the battery module according to an embodiment of the present disclosure. Also, FIG. 3 is a sectional view schematically showing a battery cell of the battery module according to an embodiment of the present disclosure.

Figure 3:
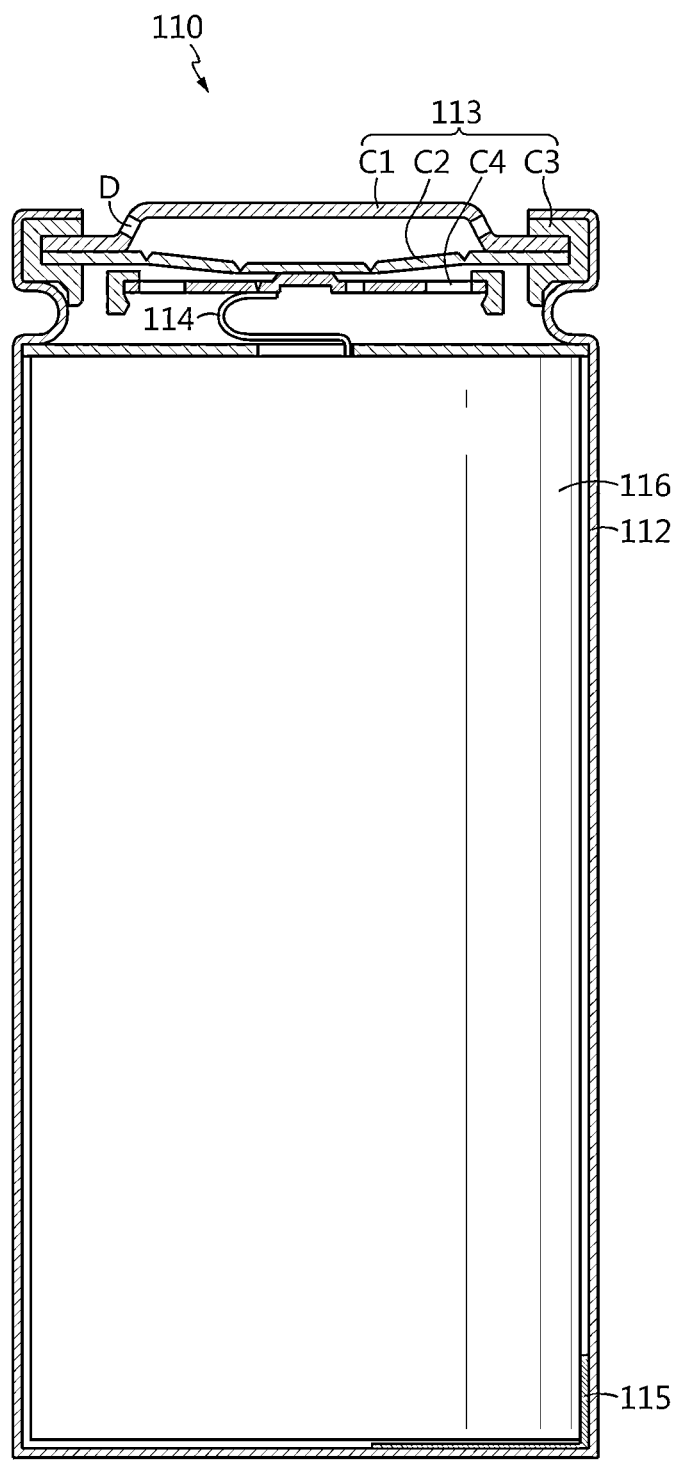
FIG. 3 is a sectional view schematically showing a battery cell of the battery module according to an embodiment of the present disclosure.

Referring to FIGS. 1 to 3, a battery module 100 according to an embodiment of the present disclosure includes a plurality of battery cells 110, a connection plate 120, and a module case 130.

Specifically, the battery cell 110 may include an electrode assembly 116, a battery can 112, and a cap assembly 113. For example, the battery cell 110 may be a cylindrical battery cell. In addition, the battery cell 110 may include electrode terminals 111 respectively located at an upper portion and a lower portion thereof. The plurality of battery cells 110 may be electrically connected by a connection plate 120 having a metal material. The plurality of battery cells 110 may be electrically connected in series, in parallel, or in series and in parallel, through the connection plate 120.

The electrode assembly 116 may have a wound structure with a separator being interposed between a positive electrode plate and a negative electrode plate. A positive electrode tab 114 may be attached to the positive electrode plate and connected to the cap assembly 113, a negative electrode tab 115 may be attached to the negative electrode plate and connected to a lower end of the battery can 112.

The battery can 112 may have an empty space so that the electrode assembly 116 may be accommodated therein. In particular, the battery can 112 may be configured in a cylindrical shape with an open top end. In addition, the battery can 112 may be made of a metal material such as steel or aluminum to secure rigidity. In addition, the negative electrode tab may be attached to the bottom of the battery can 112, such that not only the lower portion of the battery can 112 but also the battery can 112 itself may function as a negative electrode terminal.

The cap assembly 113 may be coupled to the open top end of the battery can 112 to seal the open top end of the battery can 112. The cap assembly 113 may have a circular or rectangular shape depending on the shape of the battery can 112, and may include sub-components such as a top cap C1, a vent unit C2, and a gasket C3.

Here, the top cap C1 may be located at an uppermost portion of the cap assembly 113 and configured to protrude upward. In particular, the top cap C1 may function as a positive electrode terminal in the battery cell 110. Accordingly, the top cap C1 may be electrically connected to an external device, for example another battery cell 110 or a charging device, through the connection plate 120 or the like. The top cap C1 may be made of, for example, a metal material such as stainless steel or aluminum. If a severe explosion or fire occurs at the battery cell 110, at least a part of the top cap C1 may be torn or detached from the battery can 112, thereby opening the battery can 112.

In addition, the vent unit C2 may be configured to be deformed (ruptured) when the internal pressure of the battery cell 110, namely the internal pressure of the battery can 112, increases over a predetermined level, so that the gas inside the battery can 112 may be discharged to the outside through an opening D of the top cap C1. Here, the predetermined level of the internal pressure may be 5 to 10 atmospheres.

Moreover, the gasket C3 may be made of a material with electrical insulation so that edge portions of the top cap C1 and the vent unit C2 may be insulated from the battery can 112.

Meanwhile, the cap assembly 113 may further include a current interrupt device C4. The current interrupt device C4 is also called CID. When the internal pressure of the battery increases due to gas generation so that the shape of the vent unit C2 is reversed, the contact between the vent unit C2 and the current interrupt device C4 may be broken, or the current interrupt device C4 may be damaged, thereby blocking the electrical connection between the vent unit C2 and the electrode assembly 116.

The above configuration of the battery cell 110 is widely known to those skilled in the art at the time of filing of this application, and thus will not be described in more detail. In addition, although an example of the cylindrical battery cell 110 is illustrated in FIG. 3, the battery module 100 according to the present disclosure is not limited to the configuration of the battery cell 110 having a specific shape. That is, various types of battery cells known at the time of filing of this application may be employed in the battery module 100 according to the present disclosure.

In addition, the connection plate 120 may have electrical conductivity to electrically connect the plurality of battery cells 110. The connection plate 120 may include, for example, aluminum, nickel, or copper. The connection plate 120 may include a body portion 121 and a connection portion 122. The body portion 121 may have a plate shape extending in a horizontal direction. The body portion 121 may be mounted to an upper portion or a lower portion of the module case 130. The connection portion 122 may have a shape extending from the body portion 121 to contact the electrode terminal 111. For example, as shown in FIG. 2, the connection portion 122 may have a bifurcated structure protrusively extending from the body portion 121. The connection portion 122 may be welded to the electrode terminal 111. At this time, as a welding method, resistance welding may be used, for example.

Moreover, the connection plate 120 may be mounted to an outer side of the module case 130. For example, as shown in FIG. 2, the two connection plates 120 may be mounted to the upper portion and the lower portion of the module case 130, respectively.

The module case 130 may be configured to accommodate the plurality of battery cells 110 therein. The module case 130 may include an upper frame 133 and a lower frame 134. Each of the upper frame 133 and the lower frame 134 may include a plurality of hollows 135 configured so that the plurality of battery cells 110 are partially inserted therein. The module case 130 may have a plurality of exposure holes 131. Each of the plurality of exposure holes 131 may be formed by perforating a part of the module case 130 so that the electrode terminals 111 of each of the plurality of battery cells 110 may be exposed to the outside. For example, as shown in FIG. 2, a plurality of exposure holes 131 may be provided in each of the upper surface of the upper frame 133 and the lower surface of the lower frame 134. The space between the upper surface of the upper frame 133 and the connection plate 120 may serve as a venting space in front of the battery cell 110.

The module case 130 includes a cover portion 132 having a shape protruding toward the connection plate 120. When the battery cell 110 explodes due to abnormal behavior of the battery cell 110 so that an internal material is ejected to the outside, the cover portion 132 may be configured to prevent the internal material from moving to other adjacent battery cells 110 through other adjacent exposure holes 131. The cover portion 132 may be formed to surround the exposure hole 131. The cover portion 132 may have a rib shape protruding upward from the outer surface of the module case 130.

Therefore, according to this configuration of the present disclosure, the module case 130 included in the battery module 100 according to the present disclosure includes the cover portion 132 protruding from the outer circumference of the exposure hole 131 toward the connection plate 120. This structure may physically block the movement of a high-temperature active material discharged from the exploded battery cell to adjacent battery cells while maintaining the function of ejecting, namely venting, the gas and flame generated when the battery cell is ignited. By doing so, when the battery cell 110 behaves abnormally to explode so that the internal material is ejected, gas and flame are ejected through the exposure hole 131, but the movement of the high-temperature active material is suppressed by the cover portion 132. Therefore, it is possible to prevent the internal material from moving to other adjacent battery cells 110 through other exposure holes 131. Therefore, it is possible to prevent chain ignition, such as propagating of thermal runaway, fire or explosion to other battery cells 110. Accordingly, the present disclosure may greatly improve the safety.

Figure 4:
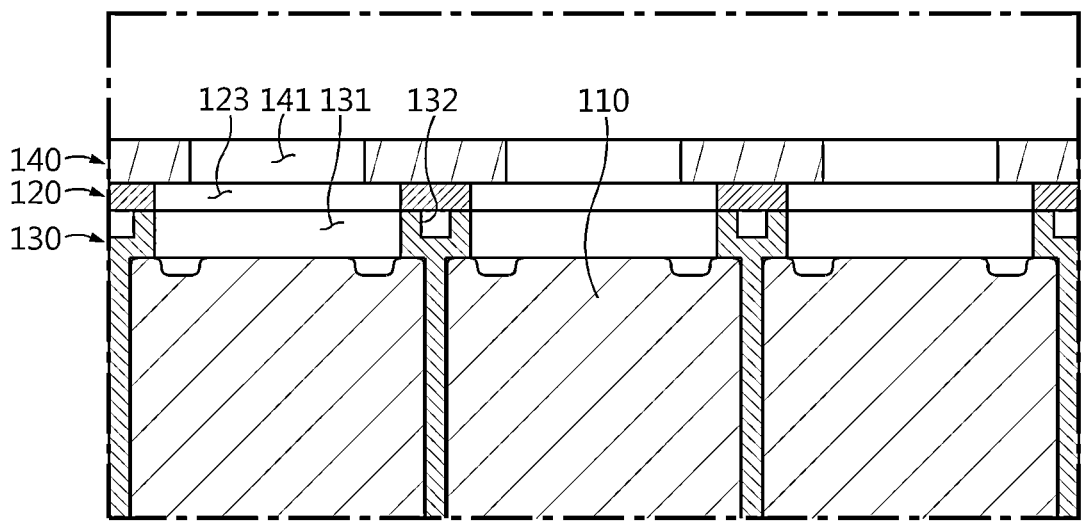
FIG. 4 is a partial vertical sectional view schematically showing a part of the battery module of FIG. 1, cut in a front and rear direction.

FIG. 4 is a partial vertical sectional view schematically showing a part of the battery module of FIG. 1, cut in a front and rear direction. At this time, the configuration of the connection portion 122 of the connection plate 120 is not shown in FIG. 4 for convenience of drawing description.

Referring to FIG. 4 along with FIG. 2, the cover portion 132 of the battery module 100 of the present disclosure may be configured in a form where a hollow H is formed and at least a top end thereof is opened. The top end of the cover portion 132 may be configured to be in contact with the lower surface of the connection plate 120, or may be positioned to be spaced apart from the lower surface of the connection plate 120 to secure a tolerance gap.

Therefore, according to this configuration of the present disclosure, since the top portion of the cover portion 132 is in contact with the lower surface of the connection plate 120, even if an explosion occurs in some of the plurality of battery cells 110, it is possible to prevent the high-temperature active material, gas and flame from moving to adjacent battery cells 110 through the empty space between the connection plate 120 and the module case 130. The space between the upper surface of the upper frame 133 and the connection plate 120 serves as a venting space in front of the battery cell 110, and the cover portion 132 maintains the venting space in an upward direction of the battery cell 110, while making the venting space maintaining the venting space to be independent for each battery cell 110 in a lateral direction of the battery cell 110. Accordingly, the cover portion 132 may suppress that the high-temperature active material is discharged to move to adjacent battery cells 110, while maintaining the function of ejecting the gas and flame generated during ignition. The cover portion 132 constitutes an isolated mechanism structure for each battery cell 110 so as to suppress the scattering of an active material mass. In this way, chain ignition may be suppressed, thereby greatly improving the safety of the battery module 100 of the present disclosure.

Figure 5:
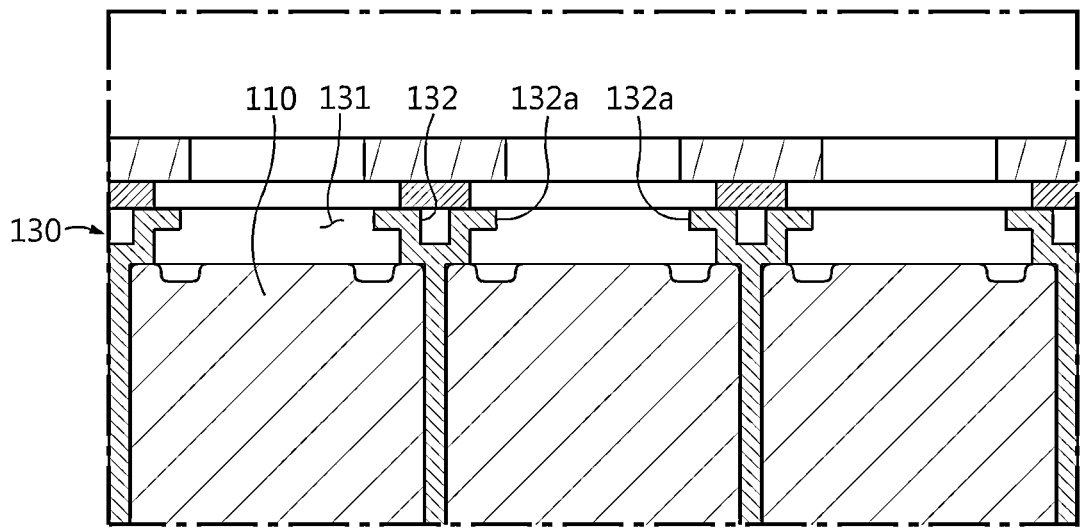
FIG. 5 is a partial sectional view schematically showing a battery module according to another embodiment of the present disclosure.

FIG. 5 is a partial sectional view schematically showing a battery module according to another embodiment of the present disclosure.

Referring to FIG. 5, in the battery module 100 according to another embodiment of the present disclosure, the cover portion 132 may further include a bending part 132*a*. The bending part 132*a* may be configured to hide a part of the exposure hole 131 of the module case 130. The bending part 132*a* may be a portion bent to extend in a horizontal direction from an end of the cover portion 132 protruding upward. The bending part 132*a* may be configured to hide a part of the open end of the cover portion 132. For example, the bending part 132*a* may be configured to be bent toward the central from the open end of the upper portion of the cover portion 132 so that the opening of the open end is more narrowed.

Therefore, according to this configuration of the present disclosure, in the present disclosure, even if an explosion occurs in some of the plurality of battery cells 110 to eject an internal material (e.g., an active material), the amount of material discharged to the outside of the module case 130 may be effectively reduced by the bending part 132*a*. Accordingly, it is possible to effectively reduce the movement of the internal material ejected from the exploded battery cell 110 to other adjacent battery cells 110. Ultimately, in the present disclosure, it is possible to provide the battery module 100 with greatly improved safety.

Figure 6:
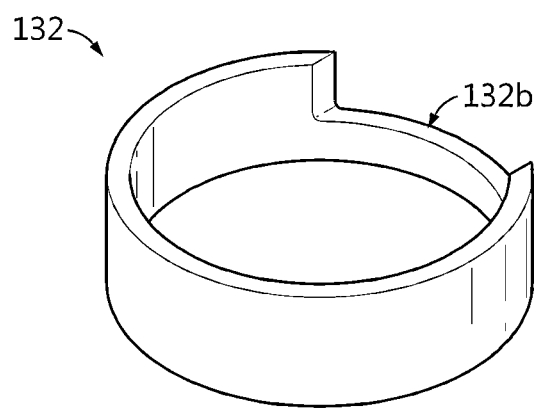
FIG. 6 is a partial sectional view schematically showing a part of a battery module according to still another embodiment of the present disclosure.

FIG. 6 is a partial sectional view schematically showing a part of a battery module according to still another embodiment of the present disclosure.

Referring to FIG. 6 along with FIG. 2, the cover portion 132 of the battery module 100 according to another embodiment of the present disclosure may include an accommodation groove 132*b*. The accommodation groove 132*b* may be formed by indenting a part of the cover portion 132 so that the connection portion 122 of the connection plate 120 may pass therethrough or be accommodated therein. For example, referring to FIG. 6, the accommodation groove 132*b* of the cover portion 132 may be formed by indenting a part of the upper end of the cover portion 132 downwards.

Therefore, according to this configuration of the present disclosure, by providing the accommodation groove 132*b* to the cover portion 132, the connection portion 122 of the connection plate 120 may be easily connected to the electrode terminal 111 of the battery cell 110.

Figure 7:
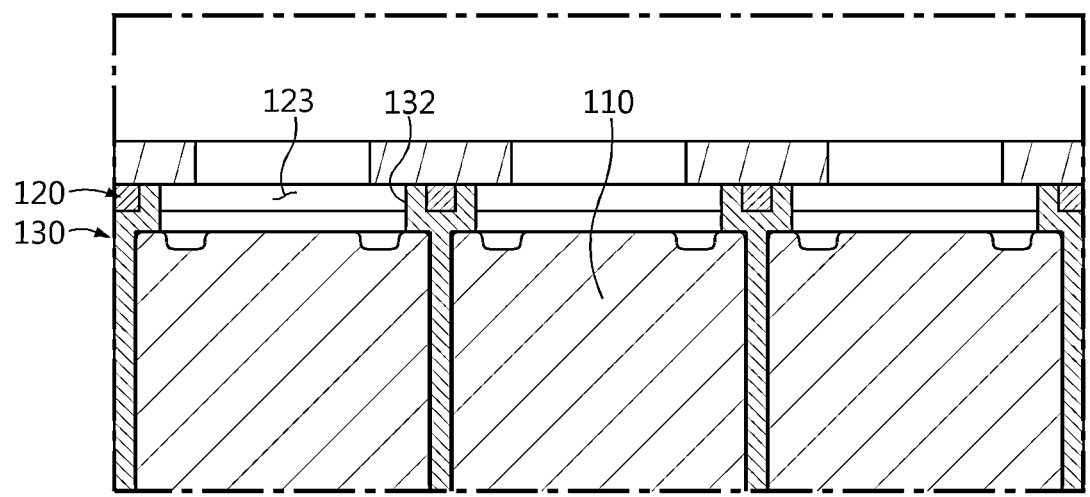
FIG. 7 is a partial sectional view schematically showing a part of a battery module according to still another embodiment of the present disclosure.

FIG. 7 is a partial sectional view schematically showing a part of a battery module according to still another embodiment of the present disclosure.

Referring to FIG. 7 along with FIGS. 2 and 6, the connection plate 120 of the battery module 100 according to another embodiment of the present disclosure may include a plurality of connection holes 123. The connection hole 123 may be formed by opening a part of the body portion 121. The connection hole 123 may be configured so that the connection portion 122 is located inside the opening. That is, the connection portion 122 may have a shape extending from the outer circumference of the connection hole 123 formed in the body portion 121.

In addition, the cover portion 132 may be configured such that an upwardly protruding part thereof is inserted into the connection hole 123. In other words, the cover portion 132 may be configured such that the open end thereof is inserted into the connection hole 123. The top end of the cover portion 132 may be positioned parallel to the upper surface of the body portion 121 of the connection plate 120.

Therefore, according to this configuration of the present disclosure, in the present disclosure, the gap between the cover portion 132 and the connection plate 120 may be effectively reduced by inserting the open end of the cover portion 132 into the connection hole 123 of the connection plate 120. Accordingly, in the present disclosure, even if an explosion occurs in some of the plurality of battery cells 110, it is possible to effectively prevent a high-temperature active material, gas, flame, or the like from being moved through the empty space between the connection plate 120 and the module case 130. Accordingly, the safety of the present disclosure may be greatly improved.

Figure 8:
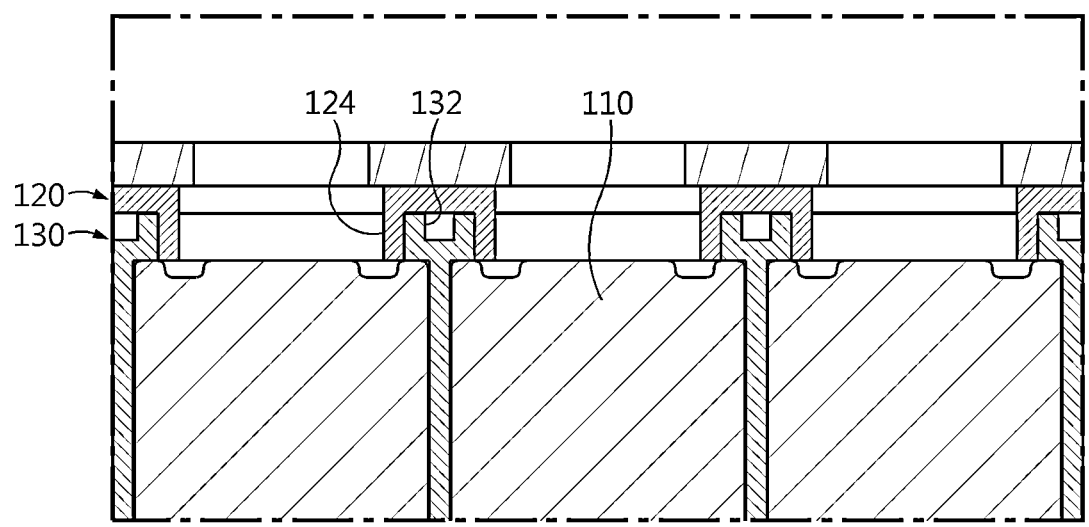
FIG. 8 is a partial sectional view schematically showing a part of a battery module according to still another embodiment of the present disclosure.

FIG. 8 is a partial sectional view schematically showing a part of a battery module according to still another embodiment of the present disclosure.

Referring to FIG. 8, the connection plate 120 of the battery module 100 according to still another embodiment of the present disclosure may further include an extension portion 124, when compared with the connection plate 120 of FIG. 4. The extension portion 124 may be configured to screen an internal material ejected from the battery cell 110. The extension portion 124 may be bent to extend from the connection hole 123 toward the battery cell 110.

For example, as shown in FIG. 8, the extension portion 124 extending downward may be provided to each of the plurality of connection holes 123. The extension portion 124 may be configured to be inserted into the cover portion 132. The extension portion 124 may extend to face the inner surface of the inside of the cover portion 132. The extension portion 124 may have a rib shape extending downward and having a 'C' shape on a plane to correspond to the internal structure of the cover portion 132, for example.

Therefore, according to this configuration of the present disclosure, in the present disclosure, since the extension portion 124 of the connection plate 120 is provided, even if an explosion occurs in some of the plurality of battery cells 110, it is possible to effectively prevent the internal material of the battery cell 110 or high-temperature active material, gas, flame, or the like from moving through the empty space between the connection plate 120 and the module case 130. Accordingly, the safety of the present disclosure may be greatly improved.

Referring to FIGS. 1, 2 and 4 again, the battery module 100 according to an embodiment of the present disclosure may further include a heat conduction pad 140. The heat conduction pad 140 may have a material with high thermal conductivity while being electrically insulating. For example, the heat conduction pad 140 may include a silicone resin.

In addition, the heat conduction pad 140 may be mounted to an outer side of the connection plate 120. The heat conduction pad 140 may include a plurality of communication holes 141. The communication hole 141 may be formed to communicate with the connection hole 123 formed in the connection plate 120. The heat conduction pad 140 may be configured to transfer heat transferred to the connection plate 120 to the outside with high thermal conductivity.

In addition, the communication hole 141 may be formed to be relatively smaller than the opening size of the connection hole 123. For example, as shown in FIG. 2, the heat conduction pad 140 may include a plurality of communication holes 141 configured to respectively communicate with the plurality of connection holes 123 formed in the connection plate 120. Each of the plurality of communication holes 141 may have a size smaller than the opening size of each of the plurality of connection holes 123.

Therefore, according to this configuration of the present disclosure, in the present disclosure, by forming the communication hole 141 relatively smaller than the opening size of the connection hole 123, the communication hole 141 may effectively screen the high-temperature active material discharged to the outside through the connection hole 123 of the connection plate 120, thereby greatly reducing the amount of the high-temperature active material discharged to the outside. Accordingly, the present disclosure may provide the battery module 100 with greatly improved safety.

Figure 9:
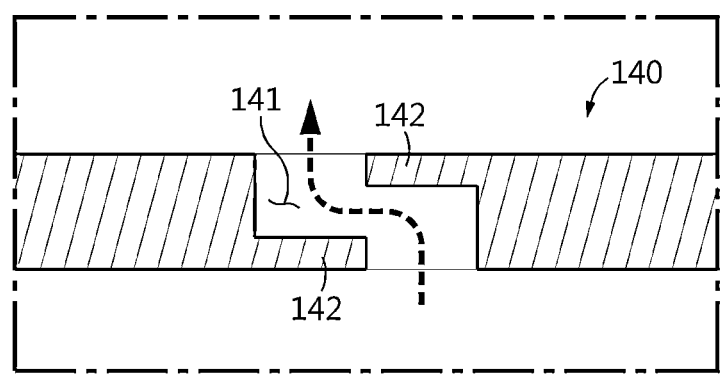
FIG. 9 is a vertical sectional view schematically showing a part of the battery module according to still another embodiment of the present disclosure.

FIG. 9 is a vertical sectional view schematically showing a part of the battery module according to still another embodiment of the present disclosure.

Referring to FIG. 9 along with FIG. 2, the heat conduction pad 140 of the battery module 100 according to still another embodiment of the present disclosure may include two or more screen portions 142 provided inside or outside the communication hole 141. Each of the two or more screen portions 142 may be configured to screen the internal material ejected from the battery cell 110. The two or more screen portions 142 may have a shape extending from the outer circumference of the communication hole 141 toward the center of the communication hole 141. The two or more screen portions 142 may be positioned to be spaced apart from each other in a vertical direction.

For example, as shown in FIG. 9, two screen portions 142 may be positioned at the inner upper end and inner lower end of the communication hole 141 of the heat conduction pad 140, respectively. The two screen portions 142 have a shape protruding from the outside of the communication hole 141 toward the center of the communication hole 141.

In addition, the heat conduction pad 140 may be configured such that, when an explosion occurs in some of the plurality of battery cells 110, the generated gas passes through the screen portion 142. In this case, the two or more screen portions 142 may be configured to screen fragments of the high-temperature electrode assembly, particularly high-temperature active material, ejected from the exploded battery cell 110 not to pass through the communication hole 141.

Therefore, according to this configuration of the present disclosure, in the present disclosure, since two or more screen portions 142 are provided to the heat conduction pad 140, it is possible to effectively prevent high-temperature fragments of the electrode assembly ejected from the exploded battery cell 110 from moving to other adjacent battery cells 110. Accordingly, the present disclosure may provide the battery module 100 with high safety.

Meanwhile, a battery pack according to an embodiment of the present disclosure may include at least one battery module 100 as described above and a battery management system (BMS) electrically connected to the battery module 100. The BMS may include various circuits or elements to control charging and discharging of the plurality of battery cells.

Meanwhile, a vehicle (not shown) according to an embodiment of the present disclosure may include at least one battery module 100 as described above and a vehicle body having an accommodation space for accommodating the battery module 100. For example, the vehicle may be an electric vehicle, an electric scooter, an electric wheelchair, or an electric bike.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
   a plurality of battery cells, each having electrode terminals respectively provided at an upper portion and a lower portion thereof;
   a connection plate having electric conductivity to electrically connect the plurality of battery cells, the connection plate including a body portion extending in a horizontal direction and a connection portion extending from the body portion to contact the corresponding electrode terminal; and
   a module case configured such that the connection plate is mounted to an outer side thereof, the module case being configured to accommodate the plurality of battery cells therein, the module case including a plurality of exposure holes configured to expose the electrode terminals of each of the plurality of battery cells to an outside and a cover portion configured to protrude toward the connection plate from an outer circumference of an exposure hole of the plurality of exposure holes,
   wherein:
   the connection plate includes a plurality of connection holes formed by opening a part of the body portion so that the connection portion is located in an opening of the body portion; and
   the cover portion is configured such that an open end of the cover portion is inserted into a connection hole of the plurality of connection holes.

2. The battery module according to claim 1, wherein the cover portion has a hollow and is shaped to be opened in at least a top end of the cover portion.

3. The battery module according to claim 1, further comprising:
   a heat conduction pad having thermal conductivity and mounted to an outer side of the connection plate, the heat conduction pad having a plurality of communication holes configured to communicate with the plurality of connection holes.

4. The battery module according to claim 3, wherein a communication hole of the plurality of communication holes is formed smaller than an opening size of the corresponding connection hole.

5. The battery module according to claim 3, wherein the heat conduction pad includes two or more screen portions respectively configured to extend toward a center of the corresponding communication hole from an outer circumference of the corresponding communication hole to screen an internal material ejected from the corresponding battery cell, the two or more screen portions being located to be spaced apart from each other.

6. The battery module according to claim 1, wherein the outside is an outside of the module case.

7. A battery pack, comprising the battery module according to claim 1.

8. A vehicle, comprising the battery module according to claim 1.

9. A battery pack, comprising the battery module according to claim 2.

10. A vehicle, comprising the battery module according to claim 2.

11. A battery pack, comprising the battery module according to claim 3.

* * * * *